(12) United States Patent
Goad

(10) Patent No.: US 10,148,626 B2
(45) Date of Patent: Dec. 4, 2018

(54) SYSTEMS AND METHODS FOR FACILITATING MOBILE TRANSACTIONS

(71) Applicant: PACIFIC DOLPHIN HOLDINGS LLC, Atlanta, GA (US)

(72) Inventor: T. Bradley M. Goad, Atlanta, GA (US)

(73) Assignee: Pacific Dolphin Holdings LLC, Atlanta, GA (US)

( * ) Notice: Subject to any disclaimer, the term of this patent is extended or adjusted under 35 U.S.C. 154(b) by 195 days.

(21) Appl. No.: 14/965,232

(22) Filed: Dec. 10, 2015

(65) Prior Publication Data

US 2016/0171202 A1  Jun. 16, 2016

Related U.S. Application Data

(60) Provisional application No. 62/090,228, filed on Dec. 10, 2014.

(51) Int. Cl.
| | | |
|---|---|---|
| *H04L 29/06* | (2006.01) | |
| *H04W 4/80* | (2018.01) | |
| *H04W 88/02* | (2009.01) | |

(52) U.S. Cl.
CPC ........... *H04L 63/0442* (2013.01); *H04W 4/80* (2018.02); *H04W 88/02* (2013.01)

(58) Field of Classification Search
None
See application file for complete search history.

(56) References Cited

U.S. PATENT DOCUMENTS

| 7,992,197 B2 | 8/2011 | Naaman et al. |
|---|---|---|
| 8,380,177 B2 | 2/2013 | Laracey |
| 8,632,000 B2 | 1/2014 | Laracey |
| 8,893,238 B2 | 11/2014 | Surace et al. |
| 9,298,904 B2 | 3/2016 | Surace et al. |
| 2001/0054111 A1 | 12/2001 | Lee et al. |

(Continued)

FOREIGN PATENT DOCUMENTS

| CN | 102217267 A | 10/2011 |
|---|---|---|
| EP | 2353269 A1 | 8/2011 |
| WO | WO 2004/092993 A1 | 10/2004 |

OTHER PUBLICATIONS

Schneier, Bruce, Applied Cryptography, 1996, John Wiley & Son, Inc., Second Edition, Section 2.5.

(Continued)

*Primary Examiner* — Amir Mehrmanesh

(74) *Attorney, Agent, or Firm* — Alston & Bird LLP

(57) ABSTRACT

The invention relates to a method for enabling the user of at least one mobile terminal to access one or more of a plurality of services corresponding to a published tag by receiving published tag data and user identification data corresponding to a user who scanned the published tag and determining whether the services corresponding to the published tag data is available for users. A unique key is generated for the user, which may be provided to the user's mobile device and is indicative of the scanned published tag. The user may then present the unique key at a user terminal to obtain access to the one or more services. Moreover, because each unique key is specific to a user and/or a mobile device, a centralized secure management entity may log usage statistics of the published tags for later reference by the user.

15 Claims, 6 Drawing Sheets

(56) References Cited

U.S. PATENT DOCUMENTS

| | | | |
|---|---|---|---|
| 2004/0043758 A1 | 3/2004 | Sorvari et al. | |
| 2004/0225613 A1 | 11/2004 | Narayanaswami et al. | |
| 2005/0097330 A1 | 5/2005 | Lundblade | |
| 2005/0282520 A1 | 12/2005 | Coureau | |
| 2008/0175390 A1* | 7/2008 | Alessio | G06Q 20/341 380/278 |
| 2009/0113527 A1* | 4/2009 | Naaman | G06F 21/41 726/5 |
| 2010/0100946 A1 | 4/2010 | Hallam-Baker | |
| 2011/0213980 A1* | 9/2011 | Surace | G06F 21/34 713/171 |
| 2014/0331294 A1* | 11/2014 | Ramallo | G06F 21/6245 726/5 |
| 2014/0357315 A1* | 12/2014 | John | H04W 4/001 455/552.1 |
| 2015/0025986 A1* | 1/2015 | Patel | G06Q 30/0207 705/16 |
| 2015/0040199 A1* | 2/2015 | Surace | G06F 21/34 726/5 |

OTHER PUBLICATIONS

Stallings, Williams, Cryptography and Network Security: Principles and Practice, 1999, Prentice Hall, Second Edition, pp. 441-461.

* cited by examiner

SYSTEMS AND METHODS FOR FACILITATING MOBILE TRANSACTIONS

CROSS-REFERENCE TO RELATED APPLICATIONS

This patent application claims priority to provisional patent application Ser. No. 62/090,228 filed Dec. 10, 2014, which is incorporated herein by reference in its entirety.

FIELD

The present application relates to systems and methods for enabling users of a mobile device to access one or more services.

BACKGROUND

During the last decade, telephones and other mobile devices have assumed an increasingly important place in everyday life. The rise in popularity and prevalence of these devices have led to increased levels of mobile device-specific advertising across mobile-device specific platforms as well as countless applications and ways in which users of mobile devices engage in everyday activities, including purchasing goods and/or services, riding transportation, accessing venues, sharing information, and/or the like.

Mobile devices may commonly be used for making traditional phone calls, may be used to access a variety of multimedia content, and may be used for identifying and validating the user in a mobility situation (street, stores, airports, etc.).

As a non-limiting example, discount coupon codes may be displayed and utilized on a mobile device (e.g., a discount on a product purchase), tickets may be generated, displayed, and validated from a mobile device (e.g., transportation tickets, concert tickets, cinema tickets, other event tickets, and/or the like). Moreover, loyalty programs (e.g., retail store specific loyalty card programs) and payment systems (e.g., credit card payment systems) may be presented and utilized via information displayed on a mobile device.

However, existing systems require substantial communication between the mobile device and a centralized server in order to transmit data related to a particular service (e.g., discount coupon usage, ticketing usage, physical entry, payment usage, and/or the like). Accordingly, the use of such existing technology is limited by the availability and functionality of a network connection between the mobile device and the central server.

Furthermore, existing systems may have a security level that is inadequate for limiting fraud, and may prevent accurate accounting and management of the use of various services or published tags by users. Accordingly, a need exists for systems and methods enabling secure management of data indicative of uses of mobile device enabled systems providing verification of a user's identity without requiring the user's mobile device to be in connection with a central server.

BRIEF SUMMARY

Various embodiments provide secure systems and methods for exchanging verified user data between a mobile device and a centralized secure management entity without requiring a networked connection between these devices. The mobile device may be paired with the secure management entity such that each device anticipates information to be passed therebetween, even without requiring a direct networked connection. Thus, a key or token (e.g., a bar code, Quick Response code, Radio Frequency Identifier, alphanumeric code, data token, unique identifier data, audio identifier, image, and/or the like) may be generated on the mobile device without a network connection, and this key may be presented to a user terminal (e.g., a Point of Sale terminal, kiosk, turnstile, web-based ecommerce server, and/or the like) which is in communication with the secure management entity. Because the secure management entity and the mobile device are paired, the secure management entity anticipates at least a portion of the data included in the key (or token) generated by the mobile device, such that the identity of the mobile device, and by association the identity of the user may be verified. Moreover, because each key comprises data unique to each user, the use of each key may be logged to manage the usage of each key.

Various embodiments are directed to a computer-implemented method enabling access to one or more services. In various embodiments, the method comprises steps for: receiving published tag data and user identification data, wherein the published tag data corresponds to one or more services offered to users; determining whether the services corresponding to the published tag data is available for users; generating a unique key comprising data indicative of the published tag data and data indicative of the user identification data; and transmitting the unique key to a mobile device of a user, wherein the mobile device is configured to provide the unique key upon receipt of a request to access the one or more services corresponding to the published tag.

In various embodiments, the method further comprises steps for: receiving the unique key during a request to access the one or more services; decoding data contained in the unique key; and enabling or not enabling the user to access the one or more services according to the decoded data. Moreover, the published tag data and the user identification data may be received from the mobile device of the user, and the published tag data may be scanned by the mobile device. In certain embodiments, the unique key is selected from the group consisting of: an image, a sound, a Near Field Communication data signal, or a string of alphanumeric characters. Moreover, in various embodiments, generating the unique key comprises encrypting at least a portion of the data contained in the unique key. In certain embodiments, encrypting at least a portion of the data contained in the unique key comprises applying a public key encryption algorithm. Moreover, the user identification data may comprise a software application identifier associated with the mobile device. In various embodiments, determining whether the services corresponding to the unique key are available comprises comparing attributes of the request to access the one or more services against requirement data associated with the one or more services. Moreover, the attributes of the request to access the one or more services may comprise at least one of: a time of the request, a number of times the one or more services have been accessed, or a number of times the user has requested the one or more services.

Various embodiments are directed to a system for enabling access to one or more services. In various embodiments, the system comprises: one or more memory storage areas; and one or more computer processors. The one or more computer processors may be configured to: receive published tag data and user identification data, wherein the published tag data corresponds to one or more services offered to users; determine whether the services corresponding to the published tag data is available for users; generate a unique key comprising data indicative of the published tag data and data indicative of the user identification data; and transmit the unique key to a mobile device of a user, wherein the mobile device is configured to provide the unique key upon receipt of a request to access the one or more services corresponding to the published tag. In various embodiments, the one or more computer processors are additionally configured to: receive the unique key during a request to access the one or more services; decode data contained in the unique key; and enable or not enabling the user to access the one or more services according to the decoded data. In various embodiments, the published tag data and the user identification data are received from the mobile device of the user, and wherein the published tag data is scanned by the mobile device. Moreover, the unique key may be selected from the group consisting of: an image, a sound, a Near Field Communication data signal, or a string of alphanumeric characters. In various embodiments, generating the unique key comprises encrypting at least a portion of the data contained in the unique key. Moreover, encrypting at least a portion of the data contained in the unique key may comprise applying a public key encryption algorithm. In certain embodiments, the user identification data comprises a software application identifier associated with the mobile device. Moreover, determining whether the services corresponding to the unique key are available may comprise comparing attributes of the request to access the one or more services against requirement data associated with the one or more services. Moreover, in various embodiments, the attributes of the request to access the one or more services comprise at least one of: a time of the request, a number of times the one or more services have been accessed, or a number of times the user has requested the one or more services.

Certain embodiments are directed to a computer program product comprising at least one non-transitory computer-readable storage medium having computer-readable program code portions stored therein. In various embodiments, the computer-readable program code portions comprise: an executable portion configured to receive published tag data and user identification data, wherein the published tag data corresponds to one or more services offered to users; an executable portion configured to determine whether the services corresponding to the published tag data is available for users; an executable portion configured to generate a unique key comprising data indicative of the published tag data and data indicative of the user identification data; and an executable portion configured to transmit the unique key to a mobile device of a user, wherein the mobile device is configured to provide the unique key upon receipt of a request to access the one or more services corresponding to the published tag.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
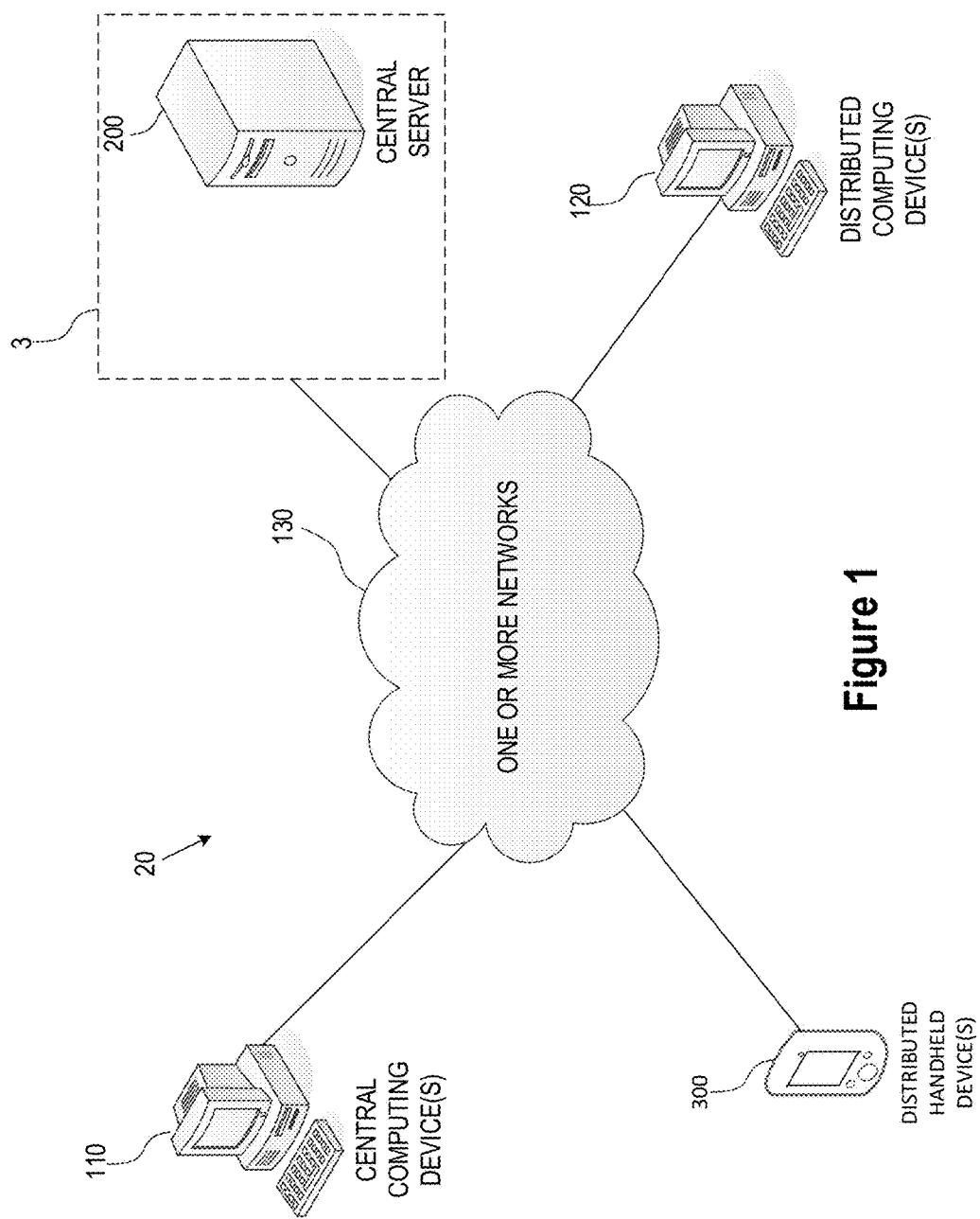
FIG. 1 is a block diagram of a system according to various embodiments.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Various embodiments of the present invention are directed to a system for facilitating mobile transactions. In various embodiments, mobile transactions may be facilitated by enabling the transfer and verification of changing information between a mobile device and a secure management entity without a direct network connection between the devices. In various embodiments, the mobile device may be configured to generate a unique key (e.g., a bar code, Quick Response code, Radio Frequency Identifier, alphanumeric code, data token, unique identifier data, a sound, an audio identifier, an image with a watermark an image without a watermark, a three-dimensional image, a hologram, and/or any other publishable and/or transmitable data) comprising data identifying the mobile device and by association the user of the mobile device. This unique key may additionally comprise data specific to a particular service requested by the user, such as a request to apply a discount to a purchase, a request to complete a purchase using a particular account, a request to validate entry into an event and/or a transportation service, and/or the like. In various embodiments, the mobile device generates the unique key without an open line of communication (either direct or indirect) with a secure management entity, thereby operating independently and without any external intervention from, for example, a secure management entity, to create the unique key. However, the secure management entity may be configured to anticipate at least a portion of the data included in the key generated by mobile device without requiring a direct network connection therebetween. Moreover, in various embodiments, the secure management entity may generate the unique key or at least a portion of the data to be included in the unique key, and may transmit the generated data to the mobile device for storage thereon. The mobile device may then later access the generated unique key without an open line of communication with the secure management entity.

Accordingly, the mobile device may present the unique key to a local computing device (e.g., a local computing system, a user terminal, a Point-of-Sale (POS) terminal, a turnstile, a web-based ecommerce server, another mobile device, and/or the like) during a transaction, and the local computing device may subsequently transmit the key to the secure management entity for validation (e.g., via wired and/or wireless forms of communication). Upon receipt of the unique key from the local computing device, the secure management entity may verify the user's identity based on at least a portion of the data included in the unique key, decrypt the remainder of the unique key to determine which services are requested, transmit a request for verification of the services to one or more entities based on the services requested, and store a log of the use of the unique key with an account associated with the user. After verification of the user's identity and the services requested, the secure management entity may transmit validation data to the local computing device such that the local computing device may complete the transaction with the user. Various systems and methods for generating a unique key without a network connection are described in U.S. Pat. No. 8,893,238, which is incorporated herein by reference in its entirety.

In short, the confirmation enables a user to access any of a plurality of services by presenting a mobile device comprising the unique key to a local computing device. Consequently, in various embodiments, the mobile device need not be in communication with the secure management entity during use of the unique key. The configuration enabling the user to access any of the plurality of services may be secure, at least in part due to the lack of required network connection when creating and/or using the unique key, and because the secure management entity itself may be secure. Thus, the configuration may provide increased security against fraudulent behavior. Moreover, the mobile device may be configured to encrypt at least a portion of the data included in the unique key (e.g., using a public/private key encryption algorithm) to provide further security against fraud. In such embodiments, the secure management entity may be configured to decrypt the data included in the unique key.

Moreover, as added security against fraud, the mobile device may be configured to request user identification data (e.g., entry of a personal identification number (PIN), a biometric scan, and/or the like) prior to generation of the unique key and/or retrieval of the unique key from memory. Accordingly, the mobile device may be configured to prevent generation and/or retrieval of a unique key without first verifying the identity of the user of the mobile device. In various embodiments, the unique key itself may comprise at least a portion of the user identification data such that the identity of the user may be verified by the secure management entity. However, in various embodiments, the user identification data may be verified locally on the mobile device (e.g., with reference to locally stored identity verification data stored on the mobile device) and the mobile device may then generate a unique key comprising other identifying data that may be verified by the secure management entity. For example, upon verifying the user's identity locally at the mobile device, the mobile device may generate a unique key comprising data identifying the mobile device (e.g., by including a software identifier in the unique key).

Moreover, various embodiments enable the tracking and/or management of uses of mobile device enabled services and/or promotions. For example, a user may utilize a mobile device to scan a published tag which itself is associated with a particular promotion. Upon receipt of data associated with a scanned tag, the mobile device may transmit data identifying the scanned tag together with data identifying the mobile device to the secure management entity, which may generate and transmit a unique, device specific key to the mobile device. In various embodiments, this unique, device specific key may be stored locally on the mobile device and presented to a local computing device during a transaction to obtain a mobile device enable service and/or promotion; however, in various embodiments the mobile device may be configured to generate an additional key without a network connection, wherein the additional key incorporates data identifying the unique key received from secure management entity as well as additional data (e.g., device identification data). As discussed above, the secure management entity may anticipate at least a portion of the data included in the generated additional key, despite the fact that the mobile device generated the key without a line of communication with the secure management entity. Thus, when the user presents the additional key to a local computing device, the local computing device may transmit the additional key to the secure management entity, which may verify and transmit verification data to the local computing device to complete the transaction.

Moreover, in various embodiments, entity tag generation entity may be configured to receive a request to generate a published tag, call-to-action, promotion, ticket, coupon, code and/or the like (collectively referred to herein as a "published tag" for brevity) by a business or other entity. The tag generation entity may be a part of the secure management entity, or it may be a separate entity. In various embodiments, a published tag may be redeemed by a user in exchange for an item and/or service, a discount on a purchase, access to a venue or mode of transportation, access to a web page, validation of a purchase, and/or the like (collectively referred to herein as "services" for brevity). In various embodiments, a published tag may comprise data indicative of various aspects of the published tag and the associated service, such as a discount type, an admission ticket type, a maximum number of uses by a particular consumer, an expiration date, and/or the like. As non-limiting examples, the tag generation entity may generate an image (e.g., a picture, a barcode, a Quick Response code, and/or the like with or without a watermark), a sound, an NFC data signal broadcast, an RFID signal broadcast, a biometric code, a three-dimensional image, a holographic image, a three-dimensional figure, a hologram, and/or publishable and/or broadcastable data to be associated with the published tag. In various embodiments, the publishable and/or broadcastable data may be associated with existing images, figures, sounds, and/or the like, such that a mobile device scanning or otherwise capturing a representation of an existing image, figure, sound, and/or the like (e.g., an existing painting or sculpture) may be interpreted by the mobile device as capturing a published tag.

The published tag may be distributed to consumers such that the consumers may access the published tag. In various embodiments, at least a portion of the published tag may be scannable by a mobile device (e.g., via an optical scanner, Near Field Communication (NFC) scanner, Radio Frequency Identifier reader, microphone, and/or the like). In response to scanning the published tag, the mobile device may transmit identifying information to the secure management entity. In response, the secure management entity may generate and transmit a unique key comprising data indicative of the published tag and data indicative of the identity of the mobile device to the mobile device. The consumer may then present the unique key to a local computing device (e.g., a POS terminal) during a transaction (e.g., a purchase transaction).

In various embodiments, upon presentation of the unique key to the local computing device during a transaction, the local computing device (e.g., a POS terminal) may transmit data indicative of the unique key to the secure management entity. In various embodiments, the data may comprise data indicative of the unique key being presented, including the identity of the mobile device associated with the unique key presented. In various embodiments, at least a portion of the data may be encrypted, such that the underlying information associated with the data may not be gleaned directly from the data. For example, the data may facilitate the management and/or tracking of the number of times a particular key associated with a particular mobile device and/or a particular published tag has been utilized, while the actual identity of the user and/or the mobile device itself cannot be gleaned from the data. In response, the secure management entity may determine whether the unique code presented satisfies applicable aspects of the published tag and/or the services associated with the published tag (e.g., a maximum number of uses by a particular consumer). In various embodiments, the determination of whether the unique code satisfies applicable aspects of the published tag may involve transmitting data indicative of the unique code to a third party system (e.g., a computing entity managing the use of one or more published tags), which may transmit response data to the secure management entity indicative of whether the unique code presented satisfies applicable aspects of the published tag and/or the services associated with the published tag. Upon a determination that the unique key presented satisfies applicable aspects of the published tag, the system may permit access to the requested services by the user (e.g., applying a promotion to a transaction between the user and the business). In various embodiments, the secure management entity and/or a third party computing entity may store data indicative of the transaction in a database that may be accessed and utilized to determine whether applicable aspects of a published tag are satisfied, to determine whether applicable requirements for later warranty claims are satisfied (e.g., whether the user requests warranty coverage for a product purchased during a transaction utilizing a unique key within an applicable time period after the occurrence of the transaction), to determine the number of users who utilize the published tag, and/or the like.

Exemplary Apparatuses, Methods, Systems, Computer Program Products, & Computing Entities Embodiments of the present invention may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Exemplary Architecture of the System

FIG. 1 is a block diagram of a system 20 that can be used in conjunction with various embodiments of the present invention. In at least the illustrated embodiment, the system 20 may include one or more central computing devices 110, one or more distributed and/or user computing devices 120, and one or more distributed handheld or mobile devices 300, all configured in communication with a central server 200 via one or more networks 130. While FIG. 1 illustrates the various system entities as separate, standalone entities, the various embodiments are not limited to this particular architecture.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 110-300 are illustrated in FIG. 1 as communicating with one another over the same network 130, these devices may likewise communicate over multiple, separate networks.

According to one embodiment, in addition to receiving data from the server 200, the distributed devices 110, 120, and/or 300 may be further configured to collect and transmit data on their own. In various embodiments, the devices 110, 120, and/or 300 may be capable of receiving data via one or more input units or devices, such as a keypad, touchpad, barcode scanner, radio frequency identification (RFID) reader, interface card (e.g., modem, etc.) or receiver. The devices 110, 120, and/or 300 may further be capable of storing data to one or more volatile or non-volatile memory modules, and outputting the data via one or more output units or devices, for example, by displaying data to the user operating the device, or by transmitting data, for example over the one or more networks 130.

Example Secure Management Entity

In various embodiments, the secure management entity 3 comprises a server 200 which includes various systems for performing one or more functions in accordance with various embodiments of the present invention, including those more particularly shown and described herein. It should be understood, however, that the server 200 might include a variety of alternative devices for performing one or more like functions, without departing from the spirit and scope of the present invention. For example, at least a portion of the server 200, in certain embodiments, may be located on the distributed device(s) 110, 120, and/or the handheld or mobile device(s) 300, as may be desirable for particular applications. As will be described in further detail below, in at least one embodiment, the handheld or mobile device(s) 300 may contain one or more mobile applications 330 which may be configured so as to provide a user interface for communication with the server 200 of the secure management entity 3, all as will be likewise described in further detail below.

Figure 2A:
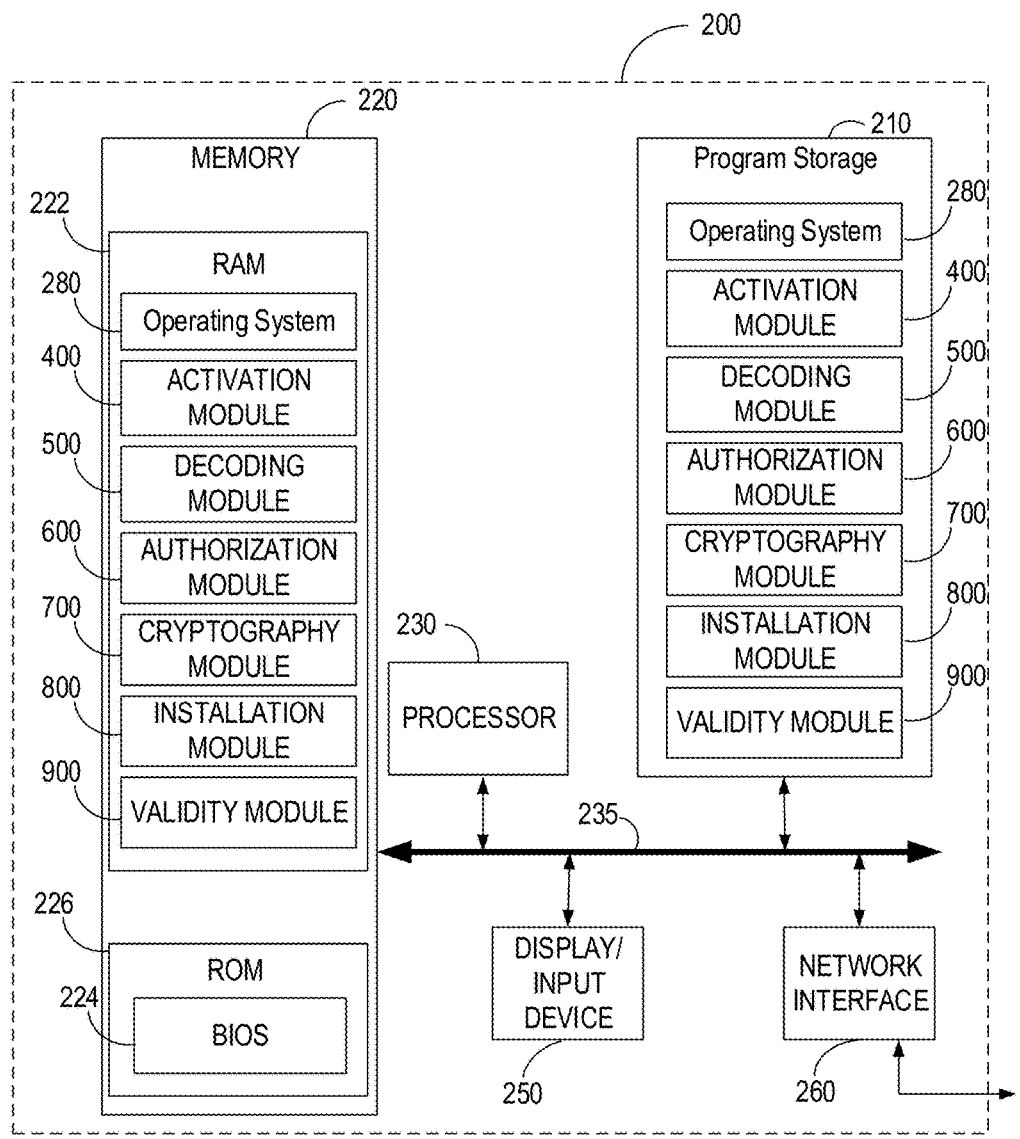
FIG. 2A is schematic block diagram of a server according to various embodiments.

FIG. 2A is a schematic diagram of the server 200 associated with the secure management entity 3 according to various embodiments. The server 200 includes a processor 230 that communicates with other elements within the server via a system interface or bus 235. Also included in the server 200 is a display/input device 250 for receiving and displaying data. This display/input device 250 may be, for example, a keyboard or pointing device that is used in combination with a monitor. The server 200 further includes memory 220, which preferably includes both read only memory (ROM) 226 and random access memory (RAM) 222. The server's ROM 226 is used to store a basic input/output system 224 (BIOS), containing the basic routines that help to transfer information between elements within the server 200. Various ROM and RAM configurations have been previously described herein.

In addition, the server 200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 210 and/or memory of the server 200 may further provide the functions of a data storage device, which may store historical and/or current delivery data and delivery conditions that may be accessed by the server 200. In this regard, the storage device 210 may comprise one or more databases. The term "database" refers to a structured collection of records or data that is stored in a computer system, such as via a relational database, hierarchical database, or network database and as such, should not be construed in a limiting fashion.

A number of program modules (e.g., modules 400-900) comprising, for example, one or more computer-readable program code portions executable by the processor 230, may be stored by the various storage devices 210 and within RAM 222. Such program modules may also include an operating system 280. In these and other embodiments, the various modules 400, 500, 600, 700 control certain aspects of the operation of the server 200 with the assistance of the processor 230 and operating system 280. In still other embodiments, it should be understood that one or more additional and/or alternative modules may also be provided, without departing from the scope and nature of the present invention.

For example, the processor may be configured to execute a module 400 for controlling the activation of the software application in the mobile device, a module 500 for decoding the data contained in a unique key which was previously created in the mobile device using the software application, and a module 600 for authorizing or preventing access to the services by the user 1 according to the decoded data.

In the embodiment described here, the central server also comprises a public key and private key cryptography module 700, a module 800 for controlling the installation of the software application in the mobile device, a module for generating the software application identifier (not illustrated) and a module 900 for limiting the validity period of the unique key which was created in the mobile device.

In various embodiments, the program modules 400, 500, 600, 700, 800, 900 are executed by the server 200 and are configured to generate one or more graphical user interfaces, reports, instructions, and/or notifications/alerts, all accessible and/or transmittable to various users of the system 20. In certain embodiments, the user interfaces, reports, instructions, and/or notifications/alerts may be accessible via one or more networks 130, which may include the Internet or other feasible communications network, as previously discussed.

In various embodiments, it should also be understood that one or more of the modules 400, 500, 600, 700, 800, 900 may be alternatively and/or additionally (e.g., in duplicate) stored locally on one or more of the devices 110, 120, and/or 300 and may be executed by one or more processors of the same. According to various embodiments, the modules 400, 500, 600, 700, 800, 900 may send data to, receive data from, and utilize data contained in one or more databases (see FIG. 4), which may be comprised of one or more separate, linked and/or networked databases.

Also located within the server 200 is a network interface 260 for interfacing and communicating with other elements of the one or more networks 130. It will be appreciated by one of ordinary skill in the art that one or more of the server 200 components may be located geographically remotely from other server components. Furthermore, one or more of the server 200 components may be combined, and/or additional components performing functions described herein may also be included in the server.

While the foregoing describes a single processor 230, as one of ordinary skill in the art will recognize, the server 200 may comprise multiple processors operating in conjunction with one another to perform the functionality described herein. In addition to the memory 220, the processor 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Distributed Handheld (or Mobile) Device(s) 300

Figure 2B:
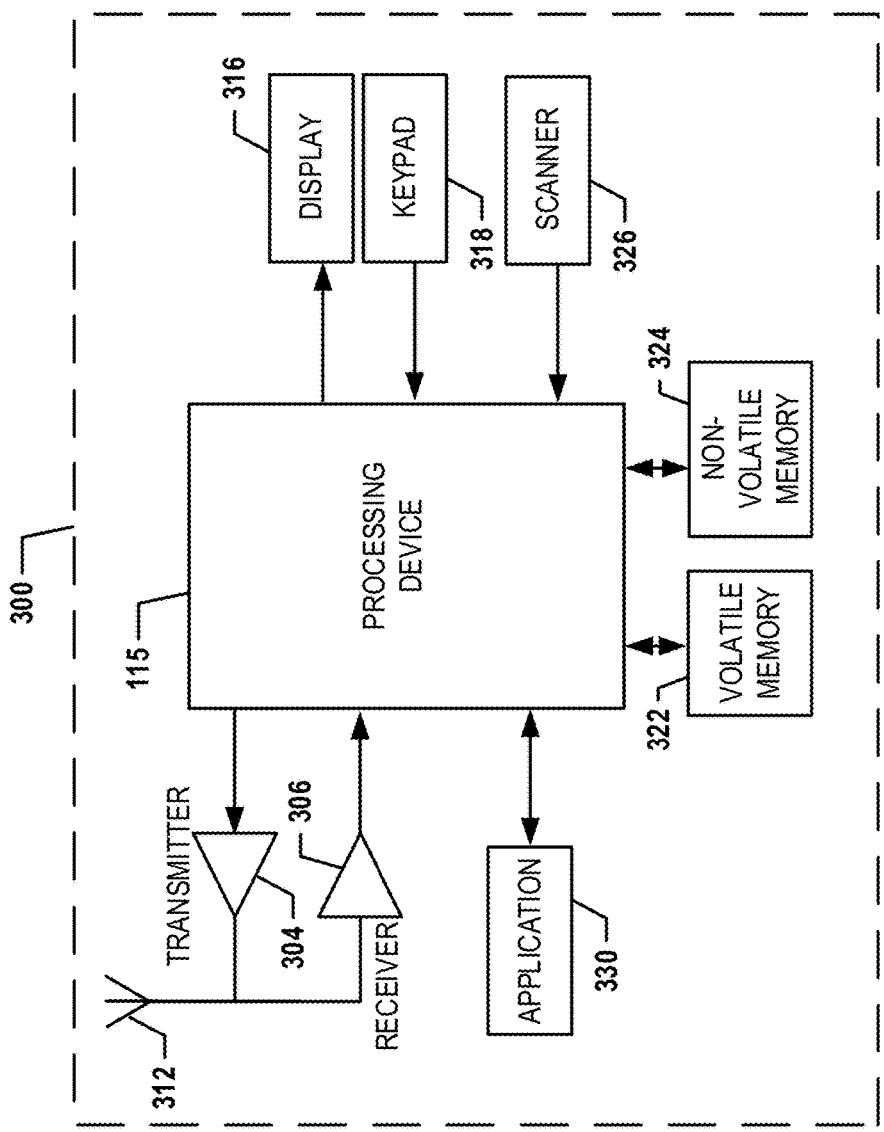
FIG. 2B is schematic block diagram of an exemplary mobile device according to various embodiments.

FIG. 2B provides an illustrative schematic representative of a mobile device 300 that can be used in conjunction with various embodiments of the present invention. Mobile devices 300 can be operated by various parties. As shown in FIG. 2B, a mobile device 300 may include an antenna 312, a transmitter 304 (e.g., radio), a receiver 306 (e.g., radio), and a processing element 308 that provides signals to and receives signals from the transmitter 304 and receiver 306, respectively.

The signals provided to and received from the transmitter 304 and the receiver 306, respectively, may include signaling data in accordance with an air interface standard of applicable wireless systems to communicate with various entities, such as the server 200 of the secure management entity 3, the distributed devices 110, 120, and/or the like. In this regard, the mobile device 300 may be capable of operating with one or more air interface standards, communication protocols, modulation types, and access types. More particularly, the mobile device 300 may operate in accordance with any of a number of wireless communication standards and protocols. In a particular embodiment, the mobile device 300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 300 can also download changes, add-ons, and updates, for instance, to its firmware, software (e.g., including executable instructions, applications, program modules), and operating system.

According to one embodiment, the mobile device 300 may include a location determining device and/or functionality. For example, the mobile device 300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 300 may also comprise a user interface (that can include a display 316 coupled to a processing element 308) and/or a user input interface (coupled to a processing element 308). The user input interface can comprise any of a number of devices allowing the mobile device 300 to receive data, such as a keypad 318 (hard or soft), a touch display, voice or motion interfaces, or other input device. In embodiments including a keypad 318, the keypad can include (or cause display of) the conventional numeric (0-9) and related keys (#, *), and other keys used for operating the mobile device 300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

In various embodiments, the mobile device 300 may also comprise one or more biometric scanning devices configured to receiving biometric user input, such as a fingerprint scanner, voice recognition device, retinal scanner, facial recognition device, and/or the like. In various embodiments, the one or more biometric scanning devices may be linked (either through hardware enabled links, firmware enabled links, and/or software enabled links) to an identity verification data store within the mobile device 300. In various embodiments, the identity verification data store may be inaccessible via a network connection with the mobile device 300, and accordingly may provide secure storage of identity verification data for the mobile device 300. In various embodiments, the mobile device 300 may be configured to provide at least a portion of the identity verification data from the identity verification data store to one or more processors, for example, in response to a request for identity verification and a signal received from the one or more biometric scanning devices associated with the mobile device 300. Accordingly, the mobile device 300 may be configured to provide identity verification data (e.g., passwords, passcodes, PINs, and/or the like) in response to a generated inquiry for verification of a user identity upon receipt of accepted input by one or more biometric scanning devices.

The mobile device 300 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 300.

The mobile device 300 may also include one or more of a scanner 326 and a mobile application 330. The scanner 326 may be configured according to various embodiments as an additional and/or alternative data collection feature, whereby one or more items may be read, stored, and/or transmitted by the mobile device 300 via the scanner. For example, the scanner 326 may comprise a camera, a Near Field Communication (NFC) receiver, a Radio Frequency Identification (RFID) reader, a microphone, and/or the like. The mobile application 330 may further provide a feature via which various tasks may be performed with the mobile device 300. Various configurations may be provided, as may be desirable for one or more users of the mobile device 300 and the system 20 as a whole.

Local Computing Entities

In various embodiments, a local computing entity (e.g., a local computing system, a user terminal, a Point-of-Sale (POS) terminal, a turnstile, a web-based ecommerce server, another mobile device, and/or the like) may have one or more features and/or configurations similar to that of the mobile devices 300 and/or central server 200. Accordingly, a local computing entity may comprise and/or be in communication with one or more memory storage areas and/or one or more processors are described herein. Moreover, in various embodiments, the local computing entity may be in communication with the secure management entity and/or other computing entities as discussed in detail herein such that the local computing entity may transmit and/or receive data (e.g., data indicative of a received unique code) to one or more computing entities.

Example System Operation

As discussed herein, various embodiments provide systems and methods for facilitating transactions utilizing a mobile device 300 by generating one or more unique keys by a mobile device 300 that may be verified by a secure management entity 3 (e.g., comprising a central server 200). As noted, the secure management entity 3 may anticipate at least a portion of the data included in the unique key in order to provide such identity verification features, and accordingly the mobile device 300 may be linked with the secure management entity 3 such that the secure management entity 3 may anticipate at least a portion of the key. Accordingly, a user of the systems and methods may register one or more mobile devices 300 with the secure management entity 3 to thereby link the mobile devices 300 and the secure management entity 3. As discussed herein, the mobile device 300 may be configured to generate the unique key based on data previously stored in the mobile device 300 and/or in association with a user account (e.g., based on membership in a corporate loyalty program, based on data indicative of a previous ticket purchase, and/or the like) and/or the mobile device 300 may be configured to generate the unique key in response to a trigger event (e.g., in response to scanning a published tag). The unique key generated by the mobile device 300 may be utilized to access one or more of a plurality of services (e.g., access to a loyalty program, access to a discount on a purchase, access to medical records, requesting that a good and/or service be delivered and/or performed for the user, access to a venue and/or facility, access to transportation services, and/or the like). For example, the unique key may comprise data indicative of a loyalty program joined by the user, and accordingly may be utilized to obtain benefits associated with the loyalty program membership. As yet another alternative, the unique key may comprise data indicative of a coupon code or other service generated and/or provided for the user in response to scanning a published tag (e.g., a QR code disseminated to the public) indicative of the availability of the coupon code.

Moreover, in various embodiments, at least a portion of the data including in a unique key may be generated by the secure management entity 3 and transmitted to the mobile device 300. In such embodiments, the mobile device 300 may be configured to store data indicative of the unique key in memory, such that the unique key may be retrieved for use.

Figure 3:
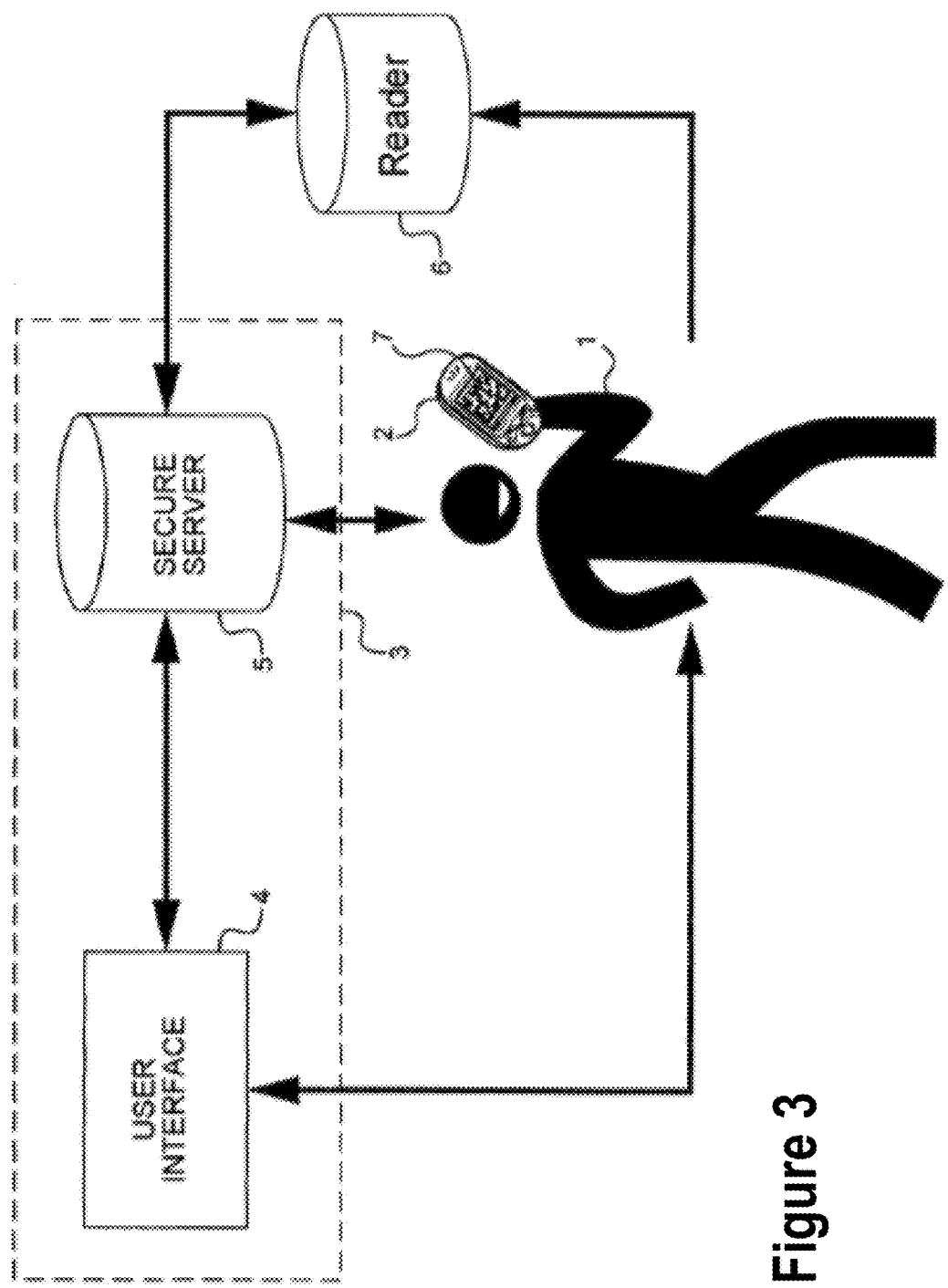
FIG. 3 schematically illustrates the context of various embodiments, in a particular embodiment.

Referring to FIG. 3, a user 1 may have one or more mobile device 300, which the user 1 may utilize to access one or more of a plurality of services. For example, the services that may be accessed by the user may comprise the offering of discount coupons on a mobile device, the possibility of purchasing and using tickets (e.g., to an event) from a mobile device, the extension of loyalty programs to a mobile device, or even payment by a mobile device or mobile payment.

Figure 4:
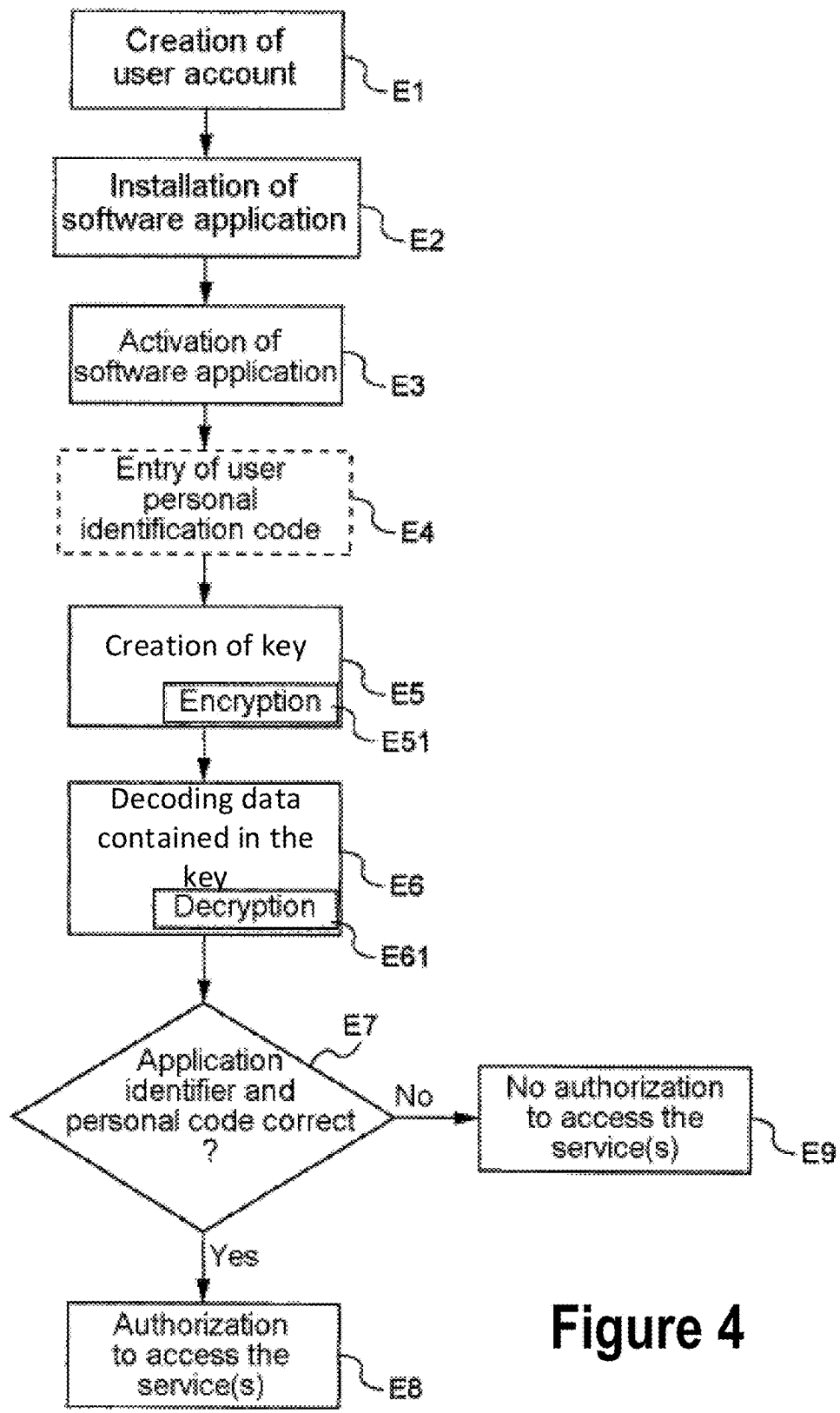
FIG. 4 is a flow diagram representing a particular embodiment of an access method according to the invention.

In various embodiments, the mobile device 300 may be configured to undertake a plurality of steps to enable the user 1 to access any of the provided services. For example, FIG. 4 is a flowchart showing an example process for enabling a user to access one or more of a plurality of services. As shown in FIG. 4, to enable the user 1 to access one or more of the services, step E1 for creation of a user account may be implemented. In various embodiments, the user account contains user identification data, which may comprise a user name, a password or other security code, biometric data (e.g., fingerprint data, eye scan data, voice recognition data, facial recognition data, and/or the like), residential address, contact information (e.g., email address, telephone number, and/or the like), program membership data (e.g., corporate loyalty card data, subscriptions, and/or the like), mobile device identifier (e.g., a serial number, user-provided "nickname" for a mobile device, IP address of the mobile device, and/or the like), and/or the like. Moreover, the user account may comprise data indicative of one or more digital keys shared between the secure management entity 3 and the one or more mobile devices 300, and/or the like. In a particular embodiment, the user account is created before any use of the software application by the user 1. In various embodiments, the user account may be generated and stored in association with the secure management entity 3 (e.g., in one or more databases) in response to user input received by the secure management entity 3. For example, the secure management entity 3 may be configured to generate and provide an Internet-accessible graphical user interface comprising one or more fillable form fields having associated prompts for user input. For example, the graphical user interface may comprise one or more form fields corresponding to each of the types of user identification data included in the user account. In various embodiments, the graphical user interface may be accessible via a web browser device on the mobile device 300, through a web browser on another computing entity (e.g., distributed computing entities 110, 120), through a specifically configured computer program (e.g., operable on a mobile device 300 and/or another computing entity), and/or the like.

As discussed herein, service providers may additionally access the secure management entity 3 and/or a third party computing system, for example via a graphical user interface displayed via one or more computing devices in order to generate and/or manage one or more services to be offered by the service providers. The interface presented to service providers may be different from that provided to users. In practice, the service providers may access the secure management entity 3 and/or a third party computing system for purposes other than those of the users. Thus, for example, the providers may log onto and/or otherwise connect with the secure management entity 3 and/or a third party computing system in order to request the creation of discount coupons for certain users, the updating of user loyalty programs, or the creation of tickets previously purchased by the users. Although the graphical user interface provided to service providers may be different from that provided to end users, the graphical user interface provided to service providers may similarly comprise one or more fillable form fields configured to accept user input. For example, a graphical user interface provided to a service provider configured to receive user input indicative of a promotion to be published by the service provider may comprise data indicative of a discount to be applied, a number of possible users who may access the discount, expiration dates of the discount, a published tag for which the discount is associated, and/or the like.

Although described herein as "service providers" this term should not be taken as limited to entities which have businesses derived based in part on providing services to consumers. Instead, "service provider" may refer to any of a variety of entities, including merchants of goods and/or services, manufacturers, restaurants, carriers, transportation entities, hospitals, individuals, representatives of individuals, representatives of other entities, political entities, entertainers, leasing entities, leasing agents, real estate agents, digital content providers, security entities, admission entities, and/or any other individual, entities, or collection of individuals and/or entities. As non-limiting examples, a provided service may comprise permitting entry of a user into a facility, providing the user with a discount voucher, sending or otherwise providing a product to user, providing digital content to a user, and/or the like.

Referring again to FIG. 4, during the illustrated installation step E2, a software application is installed in the mobile device 300. This "installation" may be either a preinstallation, that is to say a pre-embedding in the factory for example, or an installation phase conducted after the mobile device 300 has been placed on the market. In the particular embodiment described here, the installation is implemented by the user 1 of the mobile device 300. In various embodiments, the software application to be installed on the mobile device 300 is transmitted from the secure management entity 3 to the mobile device 300. Thus, the user 1 wanting to install the software application in the mobile device 300 can, for example, log onto or otherwise connect with the secure management entity 3 and download the software application. As yet another example, the user 1 may direct the mobile device 300 to visit a mobile application store (e.g., the Apple App store, the Google Play Store, the Blackberry World store, and/or the like) in order to download and install the software application.

In another example, the user 1, logged onto the secure management entity 3, can initiate on his mobile device 300 the execution of a software application installation program which will be run in the secure management entity 3.

In yet another example, the secure management entity 3 may send the mobile device 300, at the request of the user 1 or not, the software application or an object enabling the software application to be installed. This sending of the request can be done, for example, in the form of a text, multimedia or other type message, addressed by the secure management entity 3 to the mobile device 300.

Generally, the installation process, which may be performed by downloading or by any other appropriate technique, is not necessarily the responsibility of the secure management entity 3. Also, in embodiments in which the secure management entity 3 participates in the installation process, other entities (such as, for example, the mobile device 300 in the example described above) may possibly also participate in the installation.

Whatever the installation mode, data interchanges for the installation can be performed via a wireless technology (e.g., short range wireless technologies), such as, for example, via the "Bluetooth" (registered trademark) wireless technology, via long-range wireless technology, via NFC technology, and/or the like.

As a variant, the installation may be a preinstallation implemented during the assembly and/or the manufacture of the mobile device 300, that is to say that the software application is already installed when the mobile device 300 is placed on the market. In such an embodiment, the step E1 for creation of the user account may follow the step E2 for installation (preinstallation) of the software application (the order of the steps E1 and E2 illustrated in FIG. 4 is reversed).

As FIG. 4 shows, once the software application has been installed in the mobile device and the user 1 wants to use it, the next step may comprise activating the software application. To this end, a step E3 for activation of the software application installed in the mobile device is implemented. This step E3 consists in associating an identifier of the software application with the user account. This identifier may be created either before, or during the implementation of this activation step E3. Thus, prior to this activation step E3, or during said step, a step for generation of the software application identifier is performed.

The software application identifier may comprise, for example, one or more symbols and/or alphanumeric characters, a series of alphanumeric characters (that is to say, a predetermined number of letters and/or numerals and/or other symbols or characters), an image, a collection of data, and/or the like. The software application identifier may be unique to the specific software application instance installed on and/or otherwise associated with a particular mobile device, a particular user account, and/or the like.

In the particular embodiment described here, the software application identifier is generated by the secure management entity 3. This provides added security against fraud since the software application and its identifier originate from the secure management entity 3. Thus, when the secure management entity 3 supplies the software application to the manufacturers and/or assemblers of mobile devices 300 and/or to the users 1, it can, for example (but not necessarily), at the same time supply the identifier of the software application.

In a particular embodiment, the software application identifier is generated by the software application. For example, the step for generation of the software application identifier may be performed in the mobile device 300. The software application identifier may be supplied to the user 1 in various ways, for example, it may be displayed on the screen of the mobile device 300 by the software application, it may be sent to the user 1 by email or by postal mail.

The user 1 may be informed of the software application identifier, for example, during the first use of the application on the mobile device 300. Thus, according to a particular exemplary embodiment, the software application identifier is displayed on the screen of the mobile device 300 and the user 1 can then log onto the secure management entity 3 and enter or otherwise associate the software application identifier into an associated user account, for example, by entry on a keyboard or any other user input device. This entry can be performed, for example, by the mobile device 300 itself or via a personal computing entity, fixed or not, that is able to set up a connection with the secure management entity 3. In various embodiments, the software identifier may be automatically associated with both the mobile device 300 and the user account.

Once the software application has been activated, it can be used by the user 1 in order to access the services. Thus, when the user 1 wants to access a service, the user may launch or otherwise initiate the use of the software application in the mobile device. This leads to the implementation of a step E5 for creation of a unique key 7 (see an example unique key illustrated in FIG. 3) in the mobile device 300.

In the embodiment described here, prior to the implementation of the step E5 for creation of the unique key 7, a step E4 comprising, for the user 1, in provide user identification data, is implemented. For example, the user 1 may provide a user personal identification code, which comprises a series of alphanumeric characters. As a non-limiting example, this personal code contains four numerals. As additional non-limiting examples, the user 1 may provide identification data via one or more biometric devices (e.g., a fingerprint scanner) configured to determine whether the user's fingerprint indicates that an authorized user is attempting to access the software application. Corresponding data utilized to validate the entry of the user identification data may be stored (e.g., in encrypted or unencrypted form) in association with the user account and/or locally on the mobile device 300. The user 1 may be prompted for this identification data by the software application when the software application is launched and/or initiated in the mobile device 300. This makes the method according to the invention all the more safe.

Upon entry of the user identification data, a unique key 7 may be generated by the mobile device 300. In various embodiments, the unique key 7 may itself comprise data indicative of one or more services to be accessed, and in such embodiments, the mobile device 300 may first receive user input indicative of one or more services to be accessed prior to generating the unique key 7. However, in certain embodiments, upon entry of the user identification data, the mobile device 300 may generate a unique key 7 which does not comprise specific data indicative of one or more services to be accessed by the user. As discussed in greater detail herein, the unique key 7 created during the step E5 for creation of the unique key comprises at least the software application identifier. In the particular embodiment described here, the unique key 7 created also contains the user identification data provided by the user 1. This data is contained in the unique key 7 in encrypted or unencrypted form, depending on the degree of security sought. In various embodiments, the unique key 7 may comprise sufficient data to identify a user account associated with the user 1 in order to determine whether one or more services are available to the user 1. For example, in embodiments in which the unique key 7 does not itself indicate one or more services that may be accessed by the user 1, the unique key 7 may comprise sufficient data to identify a user account associated with the user 1, and another computing entity (e.g., a local computing device, the secure management entity 3, and/or the like) may be configured to determine whether one or more services available through the accessed local computing device are available to the user 1.

It will be noted that in various embodiments, the unique key 7 is generated (e.g., as a bar code, QR code, NFC data signal, RFID signal, string of alphanumeric characters, and/ or the like), whether the user's identification data is correct or incorrect. Similarly, the decoding of the unique key (e.g., by the secure management entity 3) will also take place (step E6 described below). However, the authorization to access the services will not be delivered (steps E7, E8 and E9 described below) upon a determination that the unique key 7 is not indicative of proper user identification data. For example, upon entry of incorrect user identification data, the mobile device 300 may generate an unauthorized and/or otherwise inoperable unique key 7 which does not permit authorization to access one or more services. The creation of the unique key 7 may add even more security against fraud, by notably limiting fraud by reverse engineering on the unique key 7 in the mobile device 300.

Once the unique key 7 has been created, the user 1 can use it to access the services for which the user 1 is authorized. In order to know the services that the user 1 is authorized to access, the data contained in the unique key 7 that is created may be decoded.

In particular, the unique key 7 is captured, read, and/or otherwise received by an appropriate reader 6 corresponding to a local computing device (e.g., in a physical store or virtual merchant site). Then, the data contained in the unique key 7 can be decoded during a decoding step E6, by using the secure management entity 3. In various embodiments, after receiving the unique key 7, the reader 6 may transmit data indicative of the unique key 7 to other computing entities where various steps are performed. For example, the reader 6 may transmit the data indicative of the unique key to a connected local computing device, to the secure management entity 3, both, and/or the like.

In various embodiments, the unique key 7 is a two-dimensional bar code. However, as additional non-limiting examples, a unique key 7 may comprise a bar code (one-dimensional and/or two dimensional), a Quick-Response code, a string of alphanumeric characters, a unique sound bite, a photograph, a series of flashes of a lighting device (e.g., a Light Emitting Diode), a data file (e.g., transmitted via one or more wireless communications and/or wired communications), an NFC signal, an RFID signal, and/or the like.

In various embodiments, the reader 6 may be configured to receive the unique key 7. For example, the reader may comprise an optical scanner, a Near-Field Communication receiver, an RFID tag reader, a microphone, a bar code scanner, an infrared camera, a light sensor, a keyboard, and/or the like.

The secure management entity 3 (and/or another computing entity) may be configured to decode the unique key 7, and may be configured to check the decoded data during a checking step E7. When the decoded data, which may comprise the software application identifier and/or the user's personal identification data are determined to be correct and to correspond to a particular user account, an authorization to access (E8) the service(s) is delivered to the user 1 and/or the local computing device.

As indicated herein, the unique key 7 may comprise data indicating one or more services for which access is requested. For example, the unique key 7 may comprise data indicating that the user 1 desires to provide a particular corporate loyalty card identifier to the local computing device, and accordingly the unique key 7 may comprise data indicative of the particular corporate loyalty program for which access is requested. As yet another embodiment, the unique key 7 itself may not comprise data indicative of a particular service requested, but the local computing device utilized to scan (e.g., with reader 6) the unique key may append data indicative of the service requested when transmitting the data to the secure management entity 3 for decoding and other analysis. For example, when at an ACME Corp. local computing device, personnel for ACME Corp. may scan a unique key 7 provided by a mobile device 300, and the local computing device may append data indicating that the service requested is access to an ACME Corp. loyalty program account when transmitting data indicative of the unique key 7 to the secure management entity 3. In such embodiments, the secure management entity 3 may determine whether the unique key 7 is associated with a user account which itself is associated with an ACME Corp. corporate loyalty program membership. In various embodiments, a determination of whether the user account is associated with an ACME Corp. corporate loyalty program may be determined based at least in part on data stored in one or more databases (e.g., databases maintained and associated with ACME Corp. and/or a third party).

On the contrary, when the decoded data (in particular the software application identifier and/or the user's identification data) are not correct, the authorization to access the service(s) is not delivered (E9).

The unique key 7 contains at least the software application identifier, preferably in encrypted form to increase the level of security of the method. In various embodiments, the unique key 7 also contains data identifying the user (e.g., at least a portion of the user identification data provided by the user) in encrypted form. Thus, as illustrated in FIG. 4, the step E5 for creation of the unique key includes an encryption step E51, consisting in encrypting the identifier of the software application and the identification data. In a variant in which the step E4 consisting in entering user identification data does not exist, only the identifier of the software application is encrypted during the encryption step E51. However, as a variant, it would be possible not to encrypt the software application identifier.

In the particular exemplary embodiment described in conjunction with FIG. 4, the encryption step E51 is implemented by using a public key encryption algorithm and the decoding step E6 includes a decryption step E61 consisting in decrypting the data contained in the unique key 7, by using a private key associated in a known manner with the public key. However, any of various encryption and decryption algorithms can be employed (symmetrical cryptography, hashing, digital signature, exchange of keys, etc.).

In the particular embodiment described here, the unique key 7 created in the mobile device 300 has a predetermined validity period. As explained above, this increases the security of the method according to the invention. This validity period may, for example, be of the order of a few minutes (e.g., 30 minutes, but this example being in no way limiting). A longer or shorter period may be provided, notably according to the desired level of security.

In an exemplary embodiment, a time stamp is incorporated in the unique key 7 created in the mobile device 300, that is to say, information concerning the instant at which the unique key 7 was created is inserted into the unique key 7. The timestamp can be checked by the secure management entity 3, for example once the decoding step E6 has been performed.

The user 1 may have a number of mobile devices 300 in which the software application is installed. In the embodiment described, the user account may comprise a different application identifier for each mobile device 300 belonging to the user 1. As a variant, the software applications respectively associated with the various mobile devices 300 of a same user 1 have one and the same software application identifier.

In another embodiment, the software application activation step E3 can be dispensed with. In this variant, the order of some of the steps of FIG. 4 may be different: the first step implemented is the step E2 for installing the application, followed, if necessary, by the step E4 for entry of the user identification data. Then, the step E5 for creation of the unique key 7 and the decoding step E6 are implemented, followed by the step E1 consisting in creating the user account.

The validity period of a user account created in this way may be limited to a predetermined value, for better security of use and better management of the user accounts. It is possible, if necessary, to provide for the number of services to which a user of such an account with limited duration has access to be limited. The creation of such an account with limited validity period, called "non-active account", may be followed by the step E3 for activation of the software application. In this case, the user account is said to have been activated.

As an example use, when a user 1 wants to use a discount code to make a purchase in a point of sale, once the software application has been installed and activated, the user launches the software application and provides identification data. A unique key 7 is created on his mobile device 300, this unique key 7 containing at least the identifier of the software application and the user's provided identification data, in encrypted or unencrypted form.

At the point of sale, the unique key 7 is read and transmitted to the secure management entity 3. The secure management entity 3 decodes the data contained in the unique key 7, checks the services to which the user 1 is entitled and communicates at least this information to the point of sale.

It should be noted that, in the particular embodiment described here, when the user 1 accesses the secure management entity 3 in order to create or activate a user account, the user 1 may access, one or more central servers 200 between which the various functionalities are divided (in particular, storage and/or management of the user accounts, decoding of the images, delivery and/or management of the authorizations to access the services). In the case of a plurality of servers with division of the roles, at least some of these servers may be adapted to exchange between them and/or with the other servers of the plurality of servers, certain information necessary to the execution of at least some of these functionalities. Thus, by virtue of the invention, the user can access various services securely and without repeated costs of connection to the communication networks.

In various embodiments, the generated unique key 7 may comprise specific data corresponding to particular services requested by the user 1. Moreover, the mobile device 300 may be configured to update, add, and/or otherwise modify the services available to the user 1 by modifying user account data. As discussed herein, the user account data may be modified to enable access to one or more services on a permanent basis (e.g., available until the user takes an affirmative action to disable access to the services), on a temporary time-dependent basis (e.g., available for a predetermined amount of time and/or until the occurrence of a predetermined expiration time), on a temporary event-dependent basis (e.g., available until the happening of a trigger event), and/or the like.

In various embodiments, access to one or more services may be added to a user's account (e.g., by modifying user account data) in response to one or more triggering events, such as the mobile device receiving data indicative of one or more services.

Figure 5:
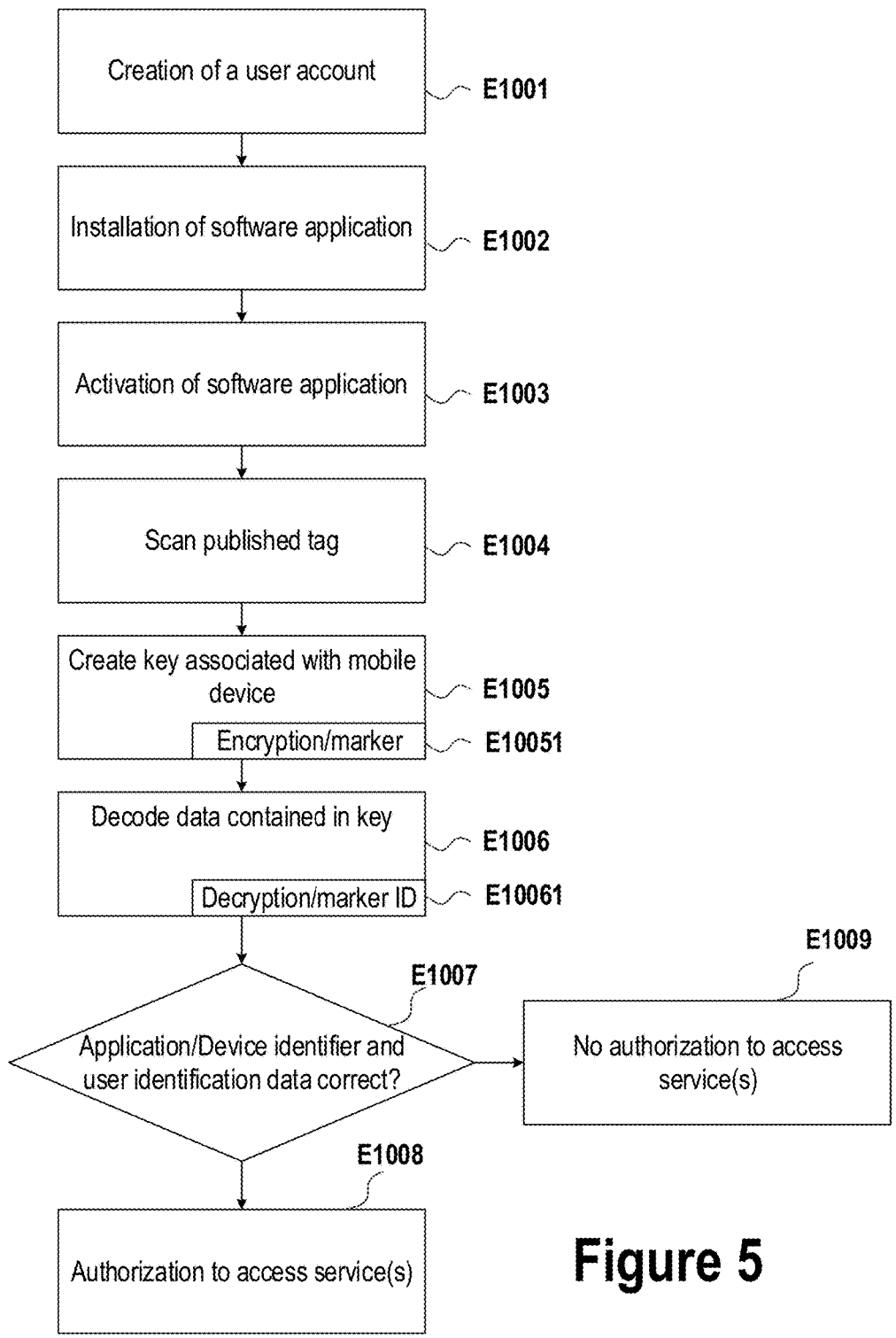
FIG. 5 illustrates a particular embodiment of a secure management device for a software application, according to the invention.

With reference to FIG. 5, which provides a flowchart of an example method for accessing one or more services, the mobile device 300 may receive data indicative of one or more services to be associated with a user account. Thus, a mobile computer program application may be installed on the mobile device 300, and the mobile device 300 may be associated with a user account (e.g., by generating a mobile device identifier and associating the mobile device 300 identifier with a user account). As indicated herein, the mobile device 300 may comprise one or more scanners (e.g., a camera, an optical scanner, an NFC reader, an RFID reader, a microphone, and/or the like) configured for receiving data indicative of a service that may be associated with a user account. In various embodiments, the system for providing access to one or more services may be entirely closed loop in nature, such that data may not be decoded and/or accessed except by components identified as a part of the system. Thus, personal identification data, service provider data, and/or the like may not be accessed by entities outside of the closed loop system.

As indicated at Blocks E1001-E1002, the method may begin with the creation of a user account and the installation of a software application on the mobile device 300, as described in detail above. Thus, the user account may be created to store data corresponding to the user, including identification data (e.g., name, residential address, contact information, and/or the like) as well as various services associated with the user account (e.g., various loyalty card programs, transportation tickets, and/or the like).

As indicated by Block E1003, the software application may be launched and/or otherwise initialized on the mobile device 300 in order to facilitate one or more additional steps. With reference to Block 1004, the mobile device 300 may be used to scan a published tag via the scanner. For example, the mobile device 300 may be used to scan a publicly available barcode and/or QR code disseminated to the public (e.g., printed on an advertisement), the mobile device 300 may be used to "listen" to a unique sound (e.g., the sound of a particular television or radio advertisement), the mobile device may be used to take a photograph of a publicly disseminated advertisement, the mobile device may be used to receive data broadcast via a wireless broadcast technology (e.g., an NFC broadcast) and/or the like. In various embodiments, the mobile device 300 may be configured to determine whether the received data (e.g., via the scanner) is associated with a particular service that may be associated with a user account. Accordingly, in various embodiments, upon receipt of data by the scanner, the mobile device 300 may be configured to launch and/or initiate the installed software program (e.g., which may be configured to operate in the background, generally invisible to the user of the mobile device 300), which may be configured to determine whether the data received by the scanner is associated with one or more services that may be associated with the user account. As indicated in FIG. 5, the installed software program may be launched and/or initiated (as indicated at Block 1003) prior to scanning the published tag (as indicated at Block E1004), such that the program directly receives the data received by the scanner. In such embodiments, the software program may request the user to provide identification data upon launching and/or initiating the software program (e.g., before scanning the published tag), and/or the software program may be configured to receive the published tag (e.g., via the scanner) before requiring the user to provide user identification data. Thus, the software program may be configured to permit users to quickly access the scanner and receive published tags, particularly in instances in which the published tags are transient in nature (e.g., the published tag is a sound bite associated with a 30-second television commercial, the published tag is a large QR code on a billboard adjacent a highway or other lane of travel, and/or the like). However, the order of steps illustrated in FIG. 5 should not be considered limiting. For example, in various embodiments, the scanning of a published tag may cause the mobile device 300 to launch and/or initiate the installed software program (thereby reversing the order of steps indicated by Blocks 1003 and 1004), which then requests the user 1 to provide identification data prior to and/or after determining whether the received published tag is associated with one or more services that may be associated with the user account.

In various embodiments, the published tag may itself comprise data indicating that the published tag is associated with a service that may be associated with a user account. However, in other embodiments, the mobile device 300 may be configured to transmit data indicative of the published tag to the secure management entity 3 which is configured to determine whether the published tag is associated with a service that may be associated with a user account. Accordingly, such determination may be made locally (e.g., on the mobile device) and/or after transmitting data indicative of the published tag to the secure management entity 3 from the mobile device 300.

Upon a determination that the published tag is associated with a service that itself may be associated with a user account, a unique key 7 may be generated, as indicated at Block 1005, comprising data indicative of the service associated with published tag and data indicative of the user identity (e.g., the mobile device identifier, a user identifier, and/or the like). In various embodiments, the mobile device 300 may be configured to generate the unique key 7 locally, without interaction with the secure management entity 3. In such embodiments, the unique key 7 may comprise data indicative of the service and data indicative of the user's identity and/or the software identifier associated with the mobile device 300. In various embodiments, the unique key 7 generated by the mobile device 300 may be encrypted, as indicated at Block E10051 (e.g., using any of the encryption methodologies described herein, such as symmetrical cryptography, hashing, digital signature, exchange of keys, etc.), and/or unencrypted. As discussed herein, the user 1 may then present the mobile device 300 with the unique key 7 to a local computing device to access the services associated with the published tag.

In various embodiments, the mobile device 300 may be configured to transmit data indicative of the published tag and the user's identity and/or the mobile device identity (e.g., the software identifier and/or at least a portion of the user identification data) to the secure management entity 3, which is configured to generate a unique key 7 for the user 1. Thus, for example, after the user 1 utilizes the mobile device 300 to scan the published tag and provides identification data, the mobile device 300 transmits the data indicative of the published tag and the identification data (e.g., the software identifier and/or at least a portion of the user identification data) to the secure management entity 3, which generates a unique key 7, and transmits the generated unique key 7 back to the mobile device 300 for storage and use by the user 1. In such embodiments, the user 1 may then present the unique key 7 generated by the secure management entity 3 to a local computing device to access the services associated with the published tag. In such embodiments, the secure management entity 3 may be configured to generate a unique key to be associated with the mobile device 300, and may generate a unique key 7 incorporating the generated unique key that is then transmitted to the mobile device 300. The mobile device 300 may then store the unique key 7 comprising the generated unique key.

In various embodiments, upon receipt of incorrect user identification data, the mobile device 300 and/or the secure management entity 3 may be configured to generate an invalid unique key 7. Similar to that described above, the invalid unique key 7 may be similar to a valid unique key 7, however, upon presentation of the invalid unique key 7 to a local computing device, the local computing device and/or the secure management entity 3 may determine that the unique key 7 is invalid and does not provide access to any services.

As discussed above, access to the one or more services associated with the published tag may be limited, and accordingly a computing entity (e.g., the mobile device 300 and/or the secure management entity 3) may be configured to determine whether access to the services may be provided to the user 1 after receiving data indicative of a scanned published tag. In various embodiments, after scanning the published tag, but before generation of the unique key 7 for the user 1, the mobile device 300 and/or the secure management entity 3 may be configured to determine whether services are available to the user 1. For example, the mobile device 300 and/or the secure management entity 3 may be configured to determine whether access to the services associated with the published tag has expired (e.g., when an expiration date and/or time is associated with the published tag), whether access to the services associated with the published tag has been exhausted (e.g., when a maximum number of scans and/or uses of the published tag and/or the associated services has been associated with the published tag), and/or the like. In various embodiments, such a determination may be made by the secure management entity 3 after the mobile device 300 transmits data indicative of the published tag, the user identification data, and/or the software identifier to the secure management entity 3.

However, in various embodiments, a determination of whether access is available to the user 1 may be made after the unique key 7 has been generated (e.g., by the mobile device 300 and/or by the secure management entity 3). For example, a determination of whether access should be granted to the user 1 to services associated with the published tag may be made when the user 1 presents the generated unique key 7 to a local computing device. Such embodiments enable the mobile device 300 to generate the unique key 7 without any interaction with the secure management entity 3, which may require a data communication between the mobile device 300 and the secure management entity 3. For example, a user 1 may use the mobile device 300 to scan a published tag and may enter user identification data into the mobile device 300. The mobile device 300 may then generate a unique key 7 locally, without interaction with the secure management entity 3. The user 1 may then present the unique key 7 on the mobile device 300 to a local computing device (e.g., by the local computing device scanning the unique key, using, for example, a bar code scanner, microphone, NFC reader, RFID reader, camera, and/or the like). The local computing device may then transmit the unique key 7 to the secure management entity 3 (e.g., via an Application Program Interface (API)), which may determine whether the unique key 7 enables access to one or more services. For example, an API may be generated and provided by the secure management entity 3 that is configured to obtain data from the local computing device and transmit the date to the secure management entity 3 in a format suitable for use by the secure management entity 3. For example, the local computing device may provide data indicative of received unique keys to the API, which may then provide such data to the secure management entity 3. Upon determination by the secure management entity 3 that the user 1 is authorized to receive one or more requested services, the secure management entity 3 may transmit data indicative of the determined authorization to the local computing device via the API. In various embodiments, the determination of whether the user 1 is authorized to receive one or more requested services may be made at least in part by a third party computing entity. In such embodiments, upon receipt of data indicative of the unique key 7 from the local computing device, the secure management entity 3 may be configured to transmit at least a portion of the received data to the third party computing entity. The third party computing entity may then determine whether the data indicates that the user 1 is authorized to receive one or more of the requested services (e.g., by comparing data received from the secure management entity 1 against stored data indicative of criteria to receive the one or more services), and may transmit data indicative of whether the user 1 is authorized to receive one or more of the requested services to the secure management entity 3.

In various embodiments, a determination of whether the unique key 7 enables access to one or more services may comprise decrypting the unique key 7 (if encrypted), as indicated at Block E1006 and determining if the contained data indicative of the scanned published tag enables access to the services (e.g., determining whether a promotion associated with the published tag has expired or is exhausted) and if the contained data indicative of the user identity is valid and associated with a user account. In various embodiments, as noted above, decryption of the unique key 7 may comprise using a public key and/or another decryption algorithm (as indicated at Block E10061) to decrypt the unique key 7. Upon a determination that both the data indicative of the published tag and the data indicative of the user identifier and/or the software identifier are valid (as indicated at Block E1007), the secure management entity 3 may permit access to the associated services, as indicated at Block E1008. For example, the secure management entity 3 may transmit data to the local computing device indicating that the services are to be provided to the user 1 (e.g., entry to an event, application of a discount to a purchase, and/or the like). However, upon a determination that data contained in the unique key 7, such as the user identification data and/or the software identifier, the secure management entity 3 may not permit authorization to the one or more services, as indicated by Block E1009.

Moreover, data indicative of the services provided to the user 1 may be stored in association with the user account associated with the user 1. Thus, for example, a log may be generated and maintained comprising data indicative of one or more redemptions and/or uses of keys associated with published tags for each user. The data stored in association with the user account may comprise time of use of the unique key 7, number of uses of the unique key 7 (or related unique keys corresponding to one or more common services), services provided to the user 1, products and/or services purchased during the transaction involving the unique key 7, warranty information related to products and/or services purchased during the transaction involving the unique key 7, location of use of the unique key 7, published tag scanned to receive the unique key 7, and/or the like.

Thus, the secure management entity 3 and/or a third party computing entity in communication with the secure management entity 3 may be configured to store (e.g., in one or more databases) data indicative of various uses and/or scans of published tags. For example, the secure management entity 3 may store data indicating that a particular published tag has been scanned (e.g., when the secure management entity 3 receives data indicative of the published tag from a mobile device 300), data indicating that a particular unique key 7 associated with a published tag has been used or generated, and/or the like. The stored data may be anonymous (e.g., not associated with user identification data and/or a user account) and/or may be associated with particular user accounts. Moreover, by maintaining stored data indicative of access to various services, the secure management entity 3 may be configured to limit access to the one or more services according to various criteria. In various embodiments, the criteria may be stored in one or more databases in association with the secure management entity 3 and/or may be stored in one or more databases managed and associated with third party entities and/or service providers. Example criteria may comprise: (1) a maximum number of times a user 1 may obtain access to services associated with a published tag; (2) a time duration after scanning the published tag during which a unique key 7 remains valid; (3) a maximum number of users 1 who may receive access to services associated with a published tag; (4) a minimum number of users 1 who may scan the published tag before access to services is permitted; (5) a date range during which access to the services associated with the published tag is available; and/or the like. For example, each user 1 may be permitted to access services associated with a particular published tag only a predefined number of times (e.g., only one discount per user). In various embodiments, the criteria may be based at least in part on user input received from a service provider in establishing a promotion, as described herein.

Moreover, services to be provided to users 1 may be dependent at least in part on attributes of the use of a unique key 7 associated with a particular published tag. For example, different services may be provided to a user 1 depending on attributes of the use of the unique key associated with a particular published tag. For example, the services to be provided to a user 1 may depend at least in part on (1) the number of times a user 1 scans a published tag; (2) the number of times a user 1 requests generation of a unique key 7 associated with a published tag; (3) the time at which the user 1 scans the published tag (e.g., time of day, day of week, day of year, and/or the like); (4) the time at which the user 1 presents a unique key associated with the published tag (e.g., time of day, day of week, day of year, and/or the like); and/or the like. As a non-limiting example, a user 1 may obtain increasing discounts for each subsequent scan of a particular published tag.

Moreover, in various embodiments the secure management entity 3 may be configured to prevent substantially simultaneous presentation of a unique key 7 generated and stored on multiple mobile devices 300. For example, for a user account associated with multiple mobile devices 300, a single unique key 7 (and/or multiple unique keys 7 corresponding to the same service and/or the same published tag scan) may be generated and associated with the user account, and may be disseminated to each of the mobile devices 300 associated with the user account. In such embodiments, upon a determination that one of the mobile devices 300 is being used to redeem a unique key 7, the secure management entity 3 may transmit data to the remaining mobile devices 300 (e.g., via a wireless communication network) blocking use of the unique key 7. For example, the unique keys 7 may be blocked visually by overlaying a visually opaque object (e.g., a virtual object displayed via a display device of the mobile device) over the unique key 7, by preventing transmission of the unique key (e.g., via NFC, sound transmission, and/or the like), and/or the like. In various embodiments, upon initial receipt of data indicating that a particular unique key 7 has been presented to a local computing device, the secure management entity 3 may be configured to identify an associated user account (if any) and transmit data to mobile devices 300 associated with the user account instructing the mobile devices 300 to block and/or otherwise prevent presentation of the unique key 7. For example, the secure management entity 3 may be configured to receive data indicating that a particular unique key 7 has been presented to a local computing device from the local computing device. Alternatively, the secure management entity 3 may be configured to receive data indicating that a unique key 7 is being accessed and/or being presented to a local computing device from the mobile device 300, for example, upon a determination that the mobile device 300 is presenting (e.g., displaying and/or broadcasting) the unique key 7.

Upon a determination that redemption of the unique key 7 is complete, and/or upon a determination that the mobile device 300 is no longer presenting and/or broadcasting the unique key 7, the secure management entity 3 may be configured to transmit data to the mobile devices 300 associated with the user account to instruct the mobile devices 300 to permit presentation and/or broadcasting of the unique key 7.

Example Use Case

An example use case of the method described herein in reference to FIG. 5 will now be presented. According to the embodiment described herein, an advertisement containing a published tag may be generated and published by a service provider. The advertisement may include text and/or images providing a description of a promotion provided by a service provider, and may comprise a published tag (e.g., a bar code, QR code, RFID tag, NFC transmitter device, and/or the like). As noted above, the published tag may comprise data indicating that one or more services are available that may be associated with a user account. As a specific example, the advertisement and the associated tag may indicate that a user may receive a coupon redeemable for a 20% discount on a purchase at Merchant A.

The user 1, upon seeing the advertisement, may use the user's mobile device 300 (e.g., a mobile phone) to scan and/or otherwise read the published tag from the advertisement. In various embodiments, the user 1 may open a specific program application installed on the mobile device 300, and may use executable portions of the software included therein to scan or otherwise read the published tag. Alternatively, as noted above, a user 1 may use any of a variety of software and/or firmware installed on the mobile device 300 to read the tag (e.g., via a scanner associated with the mobile device 300), which may cause the software application to launch and/or otherwise initiate to receive the data associated with the published tag. Thus, as a specific example, the user 1 may scan a QR code on the published advertisement in an effort to obtain the 20% discount coupon for Merchant A.

The mobile device 300 may additionally receive user input providing user identification data to be provided to the software application. For example, the user 1 may provide a password, a biometric scan, and/or the like to verify the user's identity. As discussed herein, the mobile device 300 may be configured to only generate a unique key 7 and/or retrieve a unique key 7 configured to authorize receipt of one or more services stored in memory after verifying the received user identification data. After receiving data indicative of a published tag and the user identification data, a unique key 7 may be generated for the user. In various embodiments, the mobile device 300 generates the unique key incorporating data indicative of the scanned published tag, data indicative of the user's identity, and/or data indicative of a software identifier corresponding to the mobile device 300. In various embodiments, the mobile device 300 transmits data indicative of the published tag, the user's identity, and/or the mobile device identity to the secure management entity 3, which may generate a unique key 7 that is then transmitted back to the mobile device 300 for storage in memory associated with the mobile device 300. In various embodiments, at least a portion of the data of the unique key 7 is encrypted such that only the mobile device 300 and/or the secure management entity 3 may decrypt the data included in the unique key 7. Thus, continuing the above example, after the user 1 scans the published tag regarding the 20% discount for Merchant A and provides identification data verifying the user's identity, the user is presented with a unique key 7 (e.g., a QR code, an NFC data broadcast, and/or the like) that the user may then present to a local computing device when making a purchase at Merchant A.

When attempting to redeem and/or otherwise request the services associated with the generated unique key 7, the user 1 may present the unique key 7 to a local computing device (e.g., after providing user input indicative of user identification data). The local computing device may receive the unique key 7 (e.g., by scanning the unique key 7 displayed on the screen of the mobile device 300), and may transmit data indicative of the unique key 7 to the secure management entity 3 (e.g., via an API). The secure management entity 3 may then decrypt the data of the unique key 7 (if encrypted), and may determine whether the unique key 7 corresponds to a particular user account. For example, the secure management entity 3 may verify that the provided user identification data is correct. Moreover, the secure management entity 3 may determine whether the requested services should be provided to the user 1 by comparing data associated with the published tag (identified based at least in part on a portion of the data of the unique key 7) against attributes of the presentation of the unique key 7 for the user 1. For example, the secure management entity 3 may determine whether the promotion associated with the published tag has expired, has been exhausted (either by a plurality of users or by the user 1 presenting the unique key) and/or the like. Upon a determination that the promotion is available for the user 1, the secure management entity 3 provides confirmation data to the local computing device, which may enable the promotion to be applied to the user's purchase. With reference to the above example, when the user 1 presents the unique key 7 during a purchase transaction with Merchant A, the local computing device scans the unique key 7 and transmits the unique key 7 to the secure management entity 3 to determine whether the user 1 should receive the promotion. The secure management entity 3 may verify the user's identity, whether the promotion has expired or has been exhausted (e.g., by the user 1 presenting a unique key more than a maximum number of times) and/or the like. Upon determining that the user's purchase qualifies for the promotion, the secure management entity 3 transmits confirmation data to the local computing device, which may then apply the 20% promotional discount to the user's purchase.

After using the promotion, the secure management entity 3 may receive usage data from the local computing device indicative of the use of the promotion by the user 1. The secure management entity 3 and/or a third party computing system in communication with the secure management entity 3 may store this data in a usage log in association with the user's account. As previously noted, the secure management entity 3 may utilize this data during later determinations of whether the user 1 qualifies to use a unique key 7 in the future. Moreover, the usage data may be available to the user 1 (e.g., via accessing the user account) and may provide the user 1 with data corresponding to the use of a unique key 7. With reference to the prior example, after making a purchase at Merchant A using a unique key 7, the user 1 may later access the user's account to retrieve data corresponding to the purchase transaction. For example, the user 1 may retrieve a digital purchase receipt, warranty information for purchased items, and/or the like.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method enabling access to one or more services, the method comprising:
    receiving, via a remote server, published tag data and user identification data transmitted from a mobile device of a user, wherein the published tag data is retrieved by the mobile device of the user by scanning a tag and wherein the published tag data corresponds to one or more services offered to users;
    determining, via the remote server, whether the services corresponding to the published tag data are available for the user based at least in part on the received published tag data and the user identification data;
    upon determining that the services corresponding to the published tag data are available for the user, generating, via the remote server, a unique key comprising data indicative of the published tag data and data indicative of the user identification data;
    transmitting, via the remote server, the unique key to the mobile device of the user, wherein the mobile device is configured to provide the unique key upon receipt of a request to access the one or more services corresponding to the published tag;
    after transmitting the unique key comprising data indicative of the published tag data and data indicative of the user identification data to the mobile device, receiving the unique key during a request to access the one or more services;
    decoding data contained in the unique key;
    determining whether the services corresponding to the published tag data are available for the user during the request to access the one or more services; and
    upon determining that the services corresponding to the published tag data are available for the user during the request to access the one or more services, enabling the user to access the one or more services according to the decoded data.

2. The method of claim 1, wherein the unique key is selected from the group consisting of: an image, a sound, a Near Field Communication data signal, or a string of alphanumeric characters.

3. The method of claim 1, wherein generating the unique key comprises encrypting at least a portion of the data contained in the unique key.

4. The method of claim 3, wherein encrypting at least a portion of the data contained in the unique key comprises applying a public key encryption algorithm.

5. The method of claim 1, wherein the user identification data comprises a software application identifier associated with the mobile device.

6. The method of claim 1, wherein determining whether the services corresponding to the unique key are available comprises comparing attributes of the request to access the one or more services against requirement data associated with the one or more services.

7. The method of claim 6, wherein the attributes of the request to access the one or more services comprise at least one of: a time of the request, a number of times the one or more services have been accessed, or a number of times the user has requested the one or more services.

8. A remote server system for enabling a user to access to one or more services via a mobile device, the remote server system comprising:
    one or more memory storage areas; and
    one or more computer processors configured to:
        receive published tag data and user identification data transmitted from a mobile device of a user, wherein the published tag data is retrieved by the mobile device of the user by scanning a tag and wherein the published tag data corresponds to one or more services offered to users;
        determine whether the services corresponding to the published tag data is available for the user based at least in part on the received published tag data and the user identification data;
        generate a unique key comprising data indicative of the published tag data and data indicative of the user identification data;
        transmit the unique key to the mobile device of the user, wherein the mobile device is configured to provide the unique key upon receipt of a request to access the one or more services corresponding to the published tag;
        after transmitting the unique key comprising data indicative of the published tag data and data indicative of the user identification data to the mobile device, receive the unique key during a request to access the one or more services;
        decode data contained in the unique key;
        determine whether the services corresponding to the published tag data are available for the user during the request to access the one or more services; and
        upon determining that the services corresponding to the published tag data are available for the user during the request to access the one or more services, enable the user to access the one or more services according to the decoded data.

9. The system of claim 8, wherein the unique key is selected from the group consisting of: an image, a sound, a Near Field Communication data signal, or a string of alphanumeric characters.

10. The system of claim 8, wherein generating the unique key comprises encrypting at least a portion of the data contained in the unique key.

11. The system of claim 10, wherein encrypting at least a portion of the data contained in the unique key comprises applying a public key encryption algorithm.

12. The system of claim 8, wherein the user identification data comprises a software application identifier associated with the mobile device.

13. The system of claim 8, wherein determining whether the services corresponding to the unique key are available comprises comparing attributes of the request to access the one or more services against requirement data associated with the one or more services.

14. The system of claim 13, wherein the attributes of the request to access the one or more services comprise at least one of: a time of the request, a number of times the one or more services have been accessed, or a number of times the user has requested the one or more services.

15. A computer program product comprising at least one non-transitory computer-readable storage medium having computer-readable program code portions stored therein, the computer-readable program code portions comprising:

an executable portion configured to receive published tag data and user identification data transmitted from a mobile device of a user, wherein the published tag data is retrieved by the mobile device of the user by scanning a tag and wherein the published tag data corresponds to one or more services offered to users;

an executable portion configured to determine whether the services corresponding to the published tag data is available for the user based at least in part on the received published tag data and the user identification data;

an executable portion configured to generate a unique key comprising data indicative of the published tag data and data indicative of the user identification data;

an executable portion configured to transmit the unique key to the mobile device of the user, wherein the mobile device is configured to provide the unique key upon receipt of a request to access the one or more services corresponding to the published tag; and an executable portion configured to, after transmitting the unique kev comprising data indicative of the published tag data and data indicative of the user identification data to the mobile device, receive the unique key during a request to access the one or more services;

an executable portion configured to decode data contained in the unique key;

an executable portion configured to determine whether the services corresponding to the published tag data are available for the user during the request to access the one or more services; and an executable portion configured to upon determining that the services corresponding to the published tag data are available for the user during the request to access the one or more services, enable the user to access the one or more services according to the decoded data.

* * * * *

UNITED STATES PATENT AND TRADEMARK OFFICE
CERTIFICATE OF CORRECTION

PATENT NO. : 10,148,626 B2  
APPLICATION NO. : 14/965232  
DATED : December 4, 2018  
INVENTOR(S) : Goad Page 1 of 1

It is certified that error appears in the above-identified patent and that said Letters Patent is hereby corrected as shown below:

In the Claims

Column 32,
Line 18, "unique kev" should read --unique key--.

Signed and Sealed this
Twenty-third Day of April, 2019

Andrei Iancu
*Director of the United States Patent and Trademark Office*